United States Patent [19]

Spykerman

[11] Patent Number: 5,253,838
[45] Date of Patent: Oct. 19, 1993

[54] CONTAINER HOLDER
[75] Inventor: David J. Spykerman, Holland, Mich.
[73] Assignee: Prince Corporation, Holland, Mich.
[21] Appl. No.: 855,429
[22] Filed: Mar. 23, 1992
[51] Int. Cl.[5] .............................................. A47C 7/62
[52] U.S. Cl. ................................. 248/311.2; 297/194
[58] Field of Search .................. 248/311.2; 2245/278, 2245/281, 273, 42.45 R, 275, 42.43, 42.44; 297/194, 188

[56] References Cited

U.S. PATENT DOCUMENTS

| | | |
|---|---|---|
| 2,649,270 | 8/1953 | Franks . |
| 3,606,112 | 9/1971 | Cheshier ............................ 224/42.44 |
| 4,040,659 | 8/1977 | Arnold ................................ 297/194 |
| 4,530,480 | 7/1985 | Pratt . |
| 4,708,386 | 11/1987 | Moore et al. . |
| 4,733,908 | 3/1988 | Dykstra et al. . |
| 4,738,423 | 4/1988 | DiFilippo et al. ................ 248/311.2 |
| 4,756,459 | 7/1988 | Hardman . |
| 4,783,037 | 11/1988 | Flowerday . |
| 4,792,174 | 12/1988 | Shioda . |
| 4,792,184 | 12/1988 | Lindberg et al. . |
| 4,826,058 | 5/1989 | Nakayama ................... 248/311.2 X |
| 4,854,536 | 8/1989 | Lorence et al. . |
| 4,892,281 | 1/1990 | DiFilippo et al. . |
| 4,907,775 | 3/1990 | Lorence et al. . |
| 4,943,111 | 7/1990 | VanderLaan . |
| 4,981,277 | 1/1991 | Elwell . |
| 5,087,008 | 2/1992 | Miller et al. . |

FOREIGN PATENT DOCUMENTS 443562  4/1927  Fed. Rep. of Germany .

OTHER PUBLICATIONS

Product Brochure for "Holdster" published by Imaginit, Inc., Salt Lake City, Utah, first seen Oct. 1990, author unknown.

Primary Examiner—David M. Purol
Attorney, Agent, or Firm—Price, Heneveld, Cooper, DeWitt & Litton

[57] ABSTRACT

A container holder for a vehicle includes a holding member shaped to hold a container therein, and a pair of brackets with inwardly facing clips for attaching to the exterior surface of the sidewalls of a vehicle component such as an armrest. The holding member includes laterally extending legs for slideably engaging the brackets for movement between an extended use position in which the holding member is exposed for holding a container, and a retracted storage position in which the holding member folds into a compact storage position adjacent the armrest front wall.

25 Claims, 2 Drawing Sheets

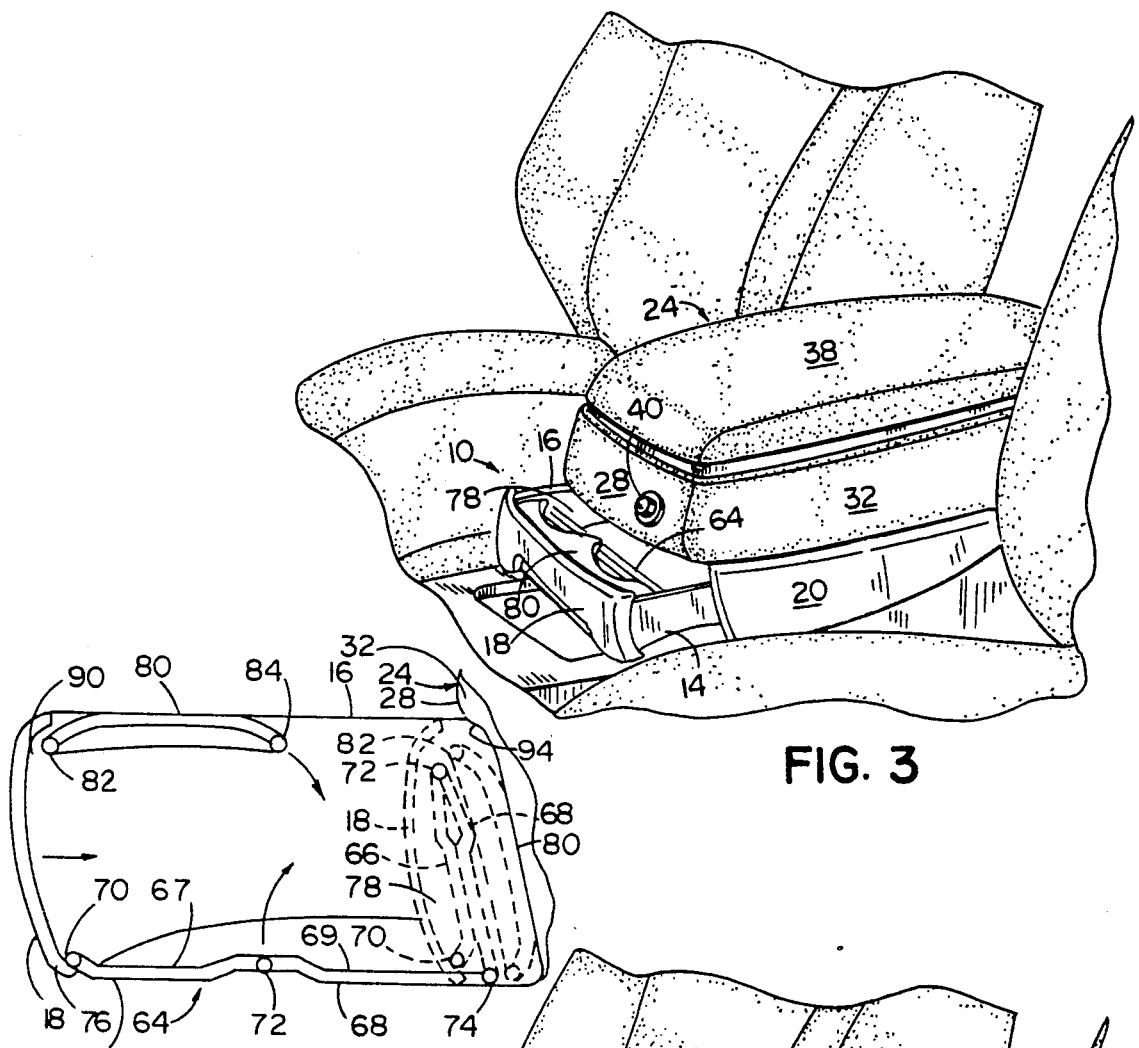
FIG. 3
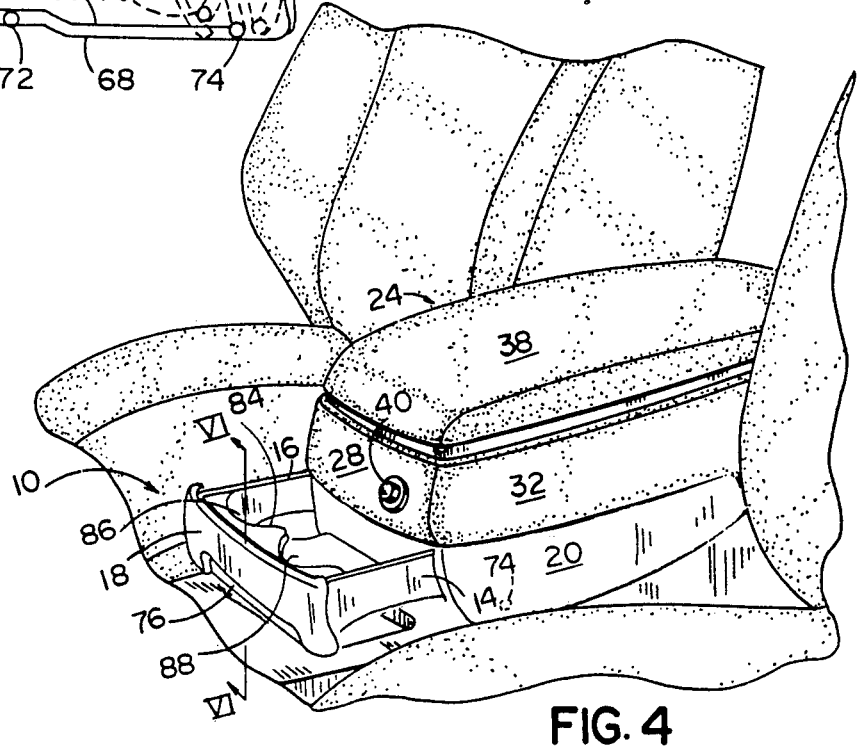
FIG. 6
FIG. 4

CONTAINER HOLDER

BACKGROUND OF THE INVENTION

The present invention relates to container holders for vehicles, and in particular to a container holder for attachment to an existing vehicle accessory such as an armrest.

Vehicles are often manufactured with the intention of installing certain optional equipment by the dealer or some other facility at a later time and place after assembly of the primary vehicle. This is often done with imported vehicles where it is desirable to add optional equipment after entry into this country. Also, delayed installation is advantageous where it is desirable to install the options at a dealership only upon consumer request. However, such post manufacture installation can create a multitude of problems such as lack of quality control, inefficient use of labor, an increased need for skilled labor, and a general increase in damaged parts, poor installation, and the like.

Thus, it is desirable to provide an accessory design for the attachment of the accessory after the original manufacture of the vehicle such that the accessory can be easily aligned and readily secured, and yet does not require multiple fasteners, tools, or skilled labor for installation. Concurrently, it is desirable to provide a structure which does not require an unacceptable appearance in the event the optional accessory is not installed. Further, it is desirable to provide a means of attachment which can be used in a wide variety of applications, but which blends into existing interior automotive decor and, in particular, which can be used to retrofit existing vehicles.

SUMMARY OF THE INVENTION

The present invention includes a vehicle accessory such as a container holder for a vehicle. The container holder includes a holding member for holding a container and bracket means for supporting the holding member. The brackets include inwardly extending means for attaching to the exterior sidewalls of a component in the vehicle, and means for movably mounting the holder member to the brackets so that the holding member is movable between an extended use position in which the holder member is exposed for holding a container, and a retracted storage position in which the holder member is positioned in a compact position adjacent the component front wall.

In one embodiment of the invention, the holding member includes laterally extending legs which are slideably engaged by the brackets for permitting the holding member to slide between the storage and use positions. In this embodiment, the legs form a U-shape with the holding member for straddling the vehicle component when the holding member is in the storage position.

In the preferred embodiment, the container holder brackets mateably fit within grooves in the armrest sidewalls to reduce the need for special handling to align the container holder during installation. The means for attaching includes clips which engage apertures in the grooves to retain the brackets therein, thus eliminating the need to use separate fasteners. Also in the preferred embodiment, the holding member includes spaced upper and bottom supports for supporting containers placed therein. These supports are designed for folding in an accordion-like fashion into a compact storage position as the container holder is moved to the storage position.

The present invention includes several advantages over known art. A container holder embodying the present invention is compatible with existing automotive interior trim designs, and can be retrofitted onto armrests, consoles, or other similar components on existing vehicles. Further, the device is relatively easy to manufacture, install, and use once installed. Thus, for example, the container holder can be installed at a dealership upon customer request or on imported vehicles at a port of entry, without the fear of poor quality installation. Still further, the invention provides a structure which does not interfere with the functions of the component to which the container holder is installed. For example, if attached to an armrest, the container holder does not interfere with the normal use of the armrest or accessing a compartment which may be included within the armrest. Also, the container holder design is readily adaptable to a variety of different component dimensions.

These and other features, objects, and advantages of the present invention will become apparent upon reading the following description thereof together with reference to the accompanying drawings in which:

BRIEF DESCRIPTION OF THE DRAWINGS

FIG. 3 is a perspective view of the container holder shown in FIG. 2, but shown in a partially extended position;

FIG. 4 is a perspective view of the container holder shown in FIG. 2 but shown in a fully extended position;

FIG. 6 is a cross-sectional view, partly in phantom form, of the container holder taken along section lines VI—VI of FIG. 4.

DETAILED DESCRIPTION OF THE PREFERRED EMBODIMENT

Figure 1:
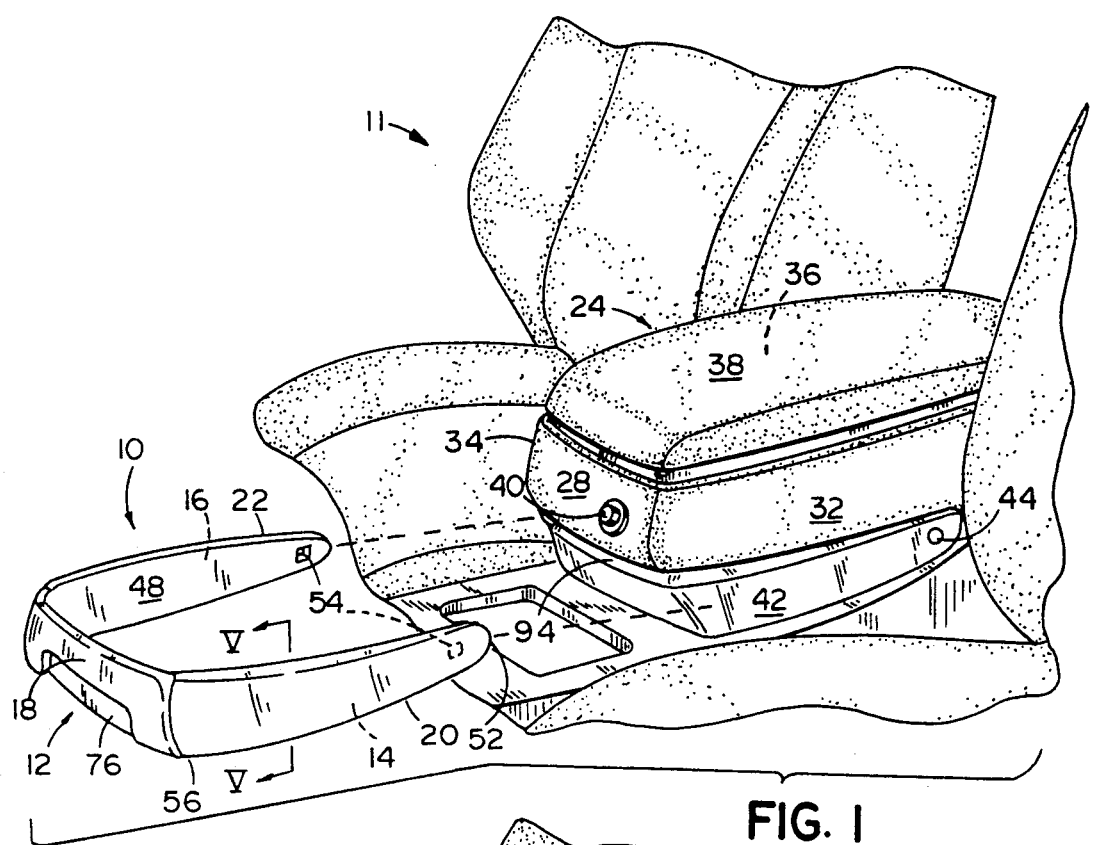
FIG. 1 is a fragmentary perspective view of a vehicle including an armrest and in exploded form, a container holder embodying the present invention shown prior to installation on the armrest.

As seen in FIG. 1, vehicle 11 such as an automobile includes an armrest 24 located between a pair of the vehicle seats such as the front seats. The armrest, as an accessory of the vehicle as originally manufactured, does not include a container holder. Thus to provide this option, a container holder 10 embodying the present invention is provided. Container holder 10 includes a U-shaped drawer-like member 12 with a pair of spaced laterally extending legs 14 and 16 (FIGS. 3 and 4) extending from either end of a transverse front wall 18. Legs 14 and 16 slideably extend within hollow elongated brackets or guides 20 and 22 which in turn are securely attached to either side of the lower half of armrest 24 by clips 54. Container holder 10 can be easily installed at car dealerships or at a port of entry for imported vehicles. Though only an armrest 24 is shown, it is particularly contemplated that container holder 10 could be installed on any vehicle component having sides for receiving legs 14 and 16 and brackets 20 and 22, particularly those components having a functionally useful top or interior compartment which an operator may wish to access and/or use without interference from container holder 10.

Armrest 24 includes a front wall 28, rear wall (not shown), and opposing sidewalls 32 and 34 forming an interior compartment 36. A cover 38 is pivotally attached to the rear wall and latched by a latch (not shown) which is released by actuating push button 40. A U-shaped recess or groove 42 extends across the lower half of front wall 28 and at least several inches rearwardly on the exterior surface of sidewalls 32 and 34. Apertures 44 are located near the rearward ends of recess 42 on each of sidewalls 32 and 34. It is contemplated that a template and drill will be used to locate and make apertures 44 at the time the present invention is to be installed on the armrest, though different arrangements are possible.

Figure 5:
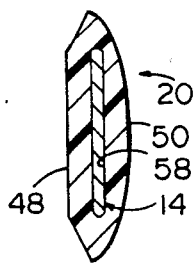
FIG. 5 is a cross-sectional view of a segment of the container holder taken along section lines V—V of FIG. 1.

Brackets 20 and 22 (FIGS. 1 and 5) each have an inner side 48 adapted to mateably engage recess 42 in sidewalls 32 and 34, and an aesthetically colored and textured outer surface 50 to conform to the vehicle interior. Brackets 20 and 22 further include a rearward end 52 and a forward end 56. A spring steel snap-in clip 54 attaches to rearward end 52 and faces inwardly therefrom. Clips 54 are adapted to engage apertures 44 in armrest sidewalls 34 and 36, and to retain brackets 20 and 22 in recess 42 on sidewalls 32 and 34. Brackets 20 and 22 are hollow to include a slot 58 (FIG. 5) which extends from forward end 56 rearwardly toward rearward end 52 terminating a distance short thereof. Slot 58 has a cross-sectional shape adapted to telescopingly receive the free ends of legs 14 and 16. The cross-section of slots 58 conform to that of legs 14 and 16 which can take on a variety of different sectional shapes in addition to that shown and may include "C" or "I" shaped cross-sections.

Figure 2:
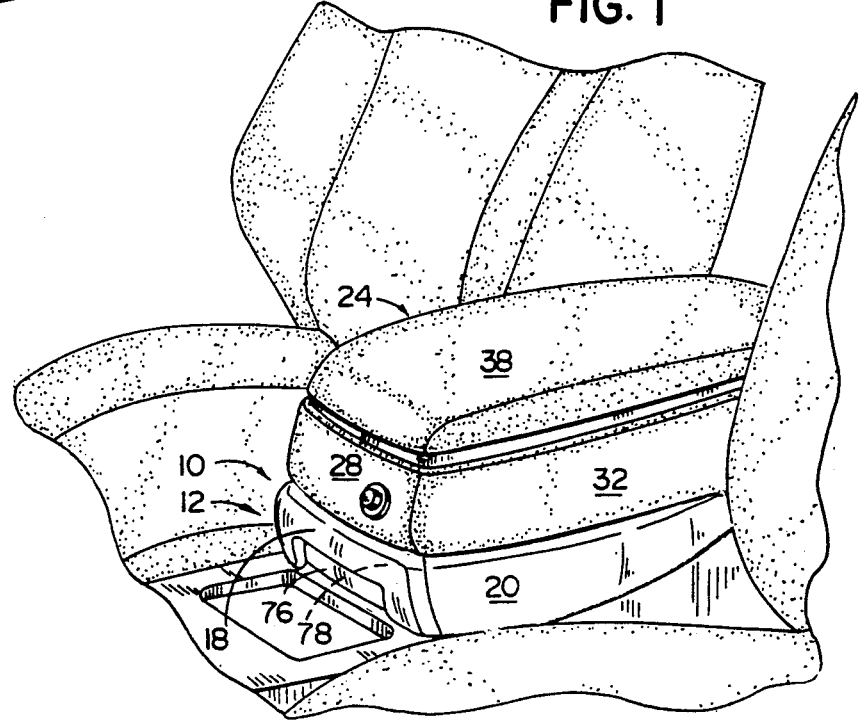
FIG. 2 is a perspective view of the container holder shown in FIG. 1 once installed and shown in a retracted storage position.

Thus, the U-shaped holding member 12 includes legs 14 and 16 having an elongated cross-sectional shape adapted to mateably telescopingly engage slots 58 in brackets 20 and 22. Legs 14 and 16 are resiliently flexible so that they can be flexed outwardly and straddle the front end of armrest 24 during installation. This facilitates installation onto armrest 24 by allowing brackets 20 and 22 to be pre-installed onto legs 14 and 16. With brackets 20 and 22 in place on legs 14 and 16, the legs are first resiliently bent outwardly a distance so that legs 14, 16 and brackets 20, 22 can be positioned around armrest 24. Legs 14 and 16 are then released so that brackets 20 and 22 move into engagement with recess 42 and clips 54 engage holes 44 in armrest sidewalls 32 and 34 (FIG. 2). Since legs 14 and 16 are securely attached to transverse wall 18, legs 14 and 16 continue to biasingly hold brackets 20 and 22 in place in recess 42 and against sidewalls 32 and 34 after releasing the legs. The outside of brackets 20 and 22 can be pressed inwardly as needed to fully lock seat clips 54 into holes 44.

Transverse wall 18 (FIG. 4) spans across front wall 28 of armrest 24. It is contemplated that the exterior surface of transverse wall 18 can also be colored and textured to match the exterior texture and surface finish of armrest 24 so as to match the general interior trim of the vehicle. Transverse wall 18 includes a handle defining notch 76 along its lower edge so that an operator can grasp the transverse wall 18 with his or her fingers to pull holding member 12 outwardly. When holding member 12 is pulled outwardly, transverse wall 18 moves to an extended use position (FIG. 4) in which transverse wall 18 and a portion of legs 14 and 16 form a pocket with front wall 28 and the forward portion of legs 14 and 16 for receiving a container (not shown).

A floor 64 for the container holder is best seen in FIG. 6 and supports the bottom of a container when placed in the container holder when in the use position shown in FIG. 4. Floor 64 includes a first and second bottom plate 66 and 68, respectively. First plate 66 is pivotally attached on its forward corners to legs 14 and 16 adjacent transverse wall 18 by hinge pins 70. Second plate 68 is pivotally attached at its forward corners to the rearward corners of first plate 66 by midpoint hinge pins 72, and further is pivotally attached at its rearward corners to brackets 20 and 22 by hinge pins 74 located near the forward lower edges of the brackets as seen in FIGS. 4 and 6. Clearance for these connections is provided by the upwardly curved lower edges of legs 14 and 16 as best seen in FIGS. 4 and 6. In the extended use position, bottom plates 66 and 68 are substantially aligned or coplanar and limit the extension of holding member 12 since bottom plates 66 and 68 extend between the front of holding member 12 and brackets 20, 22. It is contemplated that the upper surface of bottom plates 66 and 68 may include one or more recesses such as recess 67 and 69 for mateably receiving the circular bottom of a container. Hinge pins 70, 72, and 74 can be aligned as shown to provide an arrangement which tends to lock into an extended use position when a container is placed thereon. Preferably, however, midpoint hinge pins 72 are located slightly above hinge pins 70 and 74 so that as holding member 12 is moved inwardly, bottom plates 66 and 68 naturally lift upwardly toward a closed folded position.

Container holder member 12 is movable to a retracted storage position in which transverse wall 18 is positioned adjacent front wall 28 of armrest 24. In this position, transverse wall 18 forms a pocket 78 (FIG. 6) with front wall 28. Pocket 78 has a depth sufficient to receive plates 66 and 68 as they fold to a collapsed position adjacent each other.

An upper plate or support 80 (FIG. 6) is pivotally attached to the top of transverse wall 18 by a hinge pin 82 and extends rearwardly therefrom. Upper plate 80 has a shaped rear edge 84 with semi-circular recesses 86 and 88 therein for supporting the periphery of containers placed in the container holder. A spring 90 biases plate 80 toward an upward use position as shown in FIG. 4 as the container holder drawer is extended for use. As holding member 12 is moved toward the retracted storage position, the rearwardmost edges of rear edge 84 contact the upper arcuate surface 94 of recess 42 on front wall 28. This forces upper plate 80 downwardly against the bias of spring 90 into a position adjacent recess 42 of front wall 28. With holding member 12 in the retracted storage position (FIG. 6 in phantom), upper plate 80 lies in a laminar arrangement adjacent plates 68, 66, and transverse wall 18. The U-shaped member 12 including floor 64 and member 80 together with brackets 20 and 22 are molded of a suitable polymeric material such as ABS, polycarbonate or the like.

In operation, container holder 10 is preassembled with brackets 20 and 22 installed on legs 14 and 16 of U-shaped holding member 12 and with clips 54 oriented inwardly toward each other. Legs 14 and 16 are resiliently flexed outwardly and positioned around recess 42 of armrest 24 with clips 54 positioned correspondingly to holes 44 in armrest sidewalls 32 and 34. Legs 14 and 16 are then released so that brackets 20 and 22 move into engagement with recess 42 and clips 54 engage holes 44. Since legs 14 and 16 are securely attached to transverse wall 18, legs 14 and 16 continue to hold brackets 20 and 22 in place in recess 42 and against sidewalls 32 and 34 after releasing the legs. With modest pressure, clips 54 are forced into engagement with holes 44 securing clips 54 permanently therein in which clips 54 hold brackets 20 and 22 in a nested position in recess 42. Thus, container holder 10 self-aligns on armrest 24 in recess 42.

As thus installed, container holder 10 is ready for use. By grasping transverse wall 18, holding member 12 can be extended with legs 14 and 16 slidingly extending from brackets 20 and 22. The outward extending movement is limited by floor 64 as plates 66 and 68 pivotally move to an aligned co-planar position, since plates are operably connected between holding member 12 and brackets 20 and 22 by pins 70 and 74. Alternatively, by pressing transverse wall 18 rearwardly, holding member 12 moves to a position adjacent armrest 24 in which transverse wall 18 is located adjacent armrest front wall 28 with upper and bottom supports 80 and 64 folded into an accordion-like position therebetween as previously described.

In the embodiment shown, holding member 12 is U-shaped and includes transverse wall 18 and legs 14 and 16. However, it is contemplated that holding member 12 can be attached to brackets 20 and 22 in a number of different ways. For example, brackets 20 and 22 could extend forwardly of armrest sidewalls 32 and 34 in an overhanging position in front of sidewalls 32 and 34 so that holding member 12 could pivotally or slideably attach thereto. Further, holding member 12 could be a variety of different shapes, and it is contemplated that holding member can encompass different shapes other than the U-shape shown.

Thus it is seen with the container holder of the present invention a convenient and self-contained container holder is provided which is particularly adapted for post-assembly installation in a vehicle. In the preferred embodiment, the container holder is self-aligning on the vehicle component to which it is attached in a groove or recess located on the exterior sidewalls thereof, and can be attached without the use of separate fasteners by clips which engage apertures in the grooves in the component sidewalls. Further, the container holder includes laterally extending legs which slideably engage brackets holding them in place on the component sidewalls, and also includes a collapsing floor for supporting a container bottom and an upper support plate which fold in an accordion-like fashion into compact storage adjacent the vehicle component front wall.

It will become apparent to those of ordinary skill in the art that various modifications can be made to the preferred embodiment of the invention disclosed herein without departing from the spirit or scope thereof as defined by the appended claims.

The embodiments of the invention in which an exclusive property or privilege is claimed are defined as follows:

1. A container holder for a vehicle having a component with opposing sidewalls and a front wall, comprising:
   a holding member shaped to hold a container therein;
   bracket means for movably supporting said holding member, said bracket means having opposing, inwardly facing means for attaching to the exterior surface of the opposing sidewalls of the component such that said holding member and bracket means straddle the component;
   means for movably mounting said holding member to said bracket means, said holding member being movable between an extended use position in which said holding member is exposed for holding a container, and a retracted storage position in which said holding member is positioned in a compact position adjacent the component front wall; and
   foldable floor means connected to said holding member and extending toward the component front wall for supporting a container placed in said holding member, said foldable floor means being foldable against the component front wall for storage when said holding member is in said compact position.

2. A container holder for a vehicle having a component with opposing sidewalls and a front wall, comprising:
   a holding member shaped to hold a container therein, said holding member including a pair of parallel, laterally extending legs spaced apart a distance so that said legs are adapted to straddle the component sidewalls;
   bracket means for movably supporting said holding member, said bracket means having opposing, inwardly facing means for attaching to the exterior surface of the opposing sidewalls of the component such that said holding member and bracket means straddle the component; and
   means for movably mounting said holding member to said bracket means, said holding member being movable between an extended use position in which said holding member is exposed for holding a container, and a retracted storage position in which said holding member is positioned in a compact position adjacent the component front wall.

3. A container holder as defined in claim 2 wherein said bracket means includes a pair of brackets.

4. A container holder as defined in claim 3 wherein said brackets each include a slot therein, and said legs include free ends that slidingly engage said slots.

5. A container holder as defined in claim 4 wherein said legs are resiliently flexible so that said legs can be sprung apart to permit retrofit attachment of said container holder to the component.

6. A container holder as defined in claim 5 wherein said means for attaching includes clip means for engaging an aperture in the component sidewall, whereby the container holder can be installed without the use of separate fasteners.

7. A container holder for a vehicle having a component with opposing sidewalls and a front wall, comprising:
   a holding member shaped to hold a container therein, said holding member including a pair of parallel, laterally extending legs with free ends spaced apart a distance so that said free ends are adapted to straddle the component sidewalls;
   bracket means for movably supporting said holding member, said bracket means having opposing, inwardly facing means for attaching to the exterior surface of the opposing sidewalls of the component such that said holding member and bracket means straddle the component, bracket means including a pair of brackets each having a slot therein shaped to slidingly receive said free ends such that said holding member slides between said use position and said storage position; and means for movably mounting said holding member to said bracket means, said holding member being movable between an extended use position in which was holding member is exposed for holding a container, and a retracted storage position in which said holding member is positioned in a compact position adjacent the component front wall.

8. A container holder as defined by claim 7 wherein said holding member includes a transverse wall, and said transverse wall and said legs form a pocket for receiving the container therein.

9. A container holder as defined by claim 8 including a floor for supporting the bottom of a container thereon, said floor being pivotally connected to said transverse wall and movable between a substantially horizontal position when said holding member is in said extended use position and a compact storage position when said holding member is in said retracted storage position.

10. A container holder as defined by claim 8 wherein said holding member includes a floor for supporting a container thereon, said floor including a first and second bottom plate member, said first bottom plate member being pivotally connected to said holding member transverse wall and also to said second bottom plate member, said second bottom plate member further being pivotally connected to said brackets so that as said holding member is moved to said storage position, said first and second members fold into an accordion-like compact arrangement adjacent and between said transverse wall of said holding member and the front wall of the component.

11. A container holder as defined by claim 10 including an upper support member for supporting a side of the container placed therein when said container holder is in said extended use position, said upper support member being pivotally connected to said transverse wall for movement to a collapsed position when said holding member is moved to said retracted storage position.

12. A container holder as defined by claim 11 wherein said upper support member includes an arcuately shaped rear edge adapted to support the sides of the container placed therein.

13. A container holder as defined by claim 10 wherein said bottom plates include one or more recesses for receiving the bottom of a container placed therein.

14. A container holder for a vehicle having a component therein with opposing sidewalls and a front wall, comprising:

a holding member shaped to hold a container therein;

a bracket means for movably supporting said holding member, said bracket means having opposing, inwardly facing means for attaching to the exterior surface of the opposing sidewalls of the component such that said holding member and bracket means straddle the component;

means for movably mounting said holding member to said bracket means, said holding member being movable between an extended use position in which said holding member is exposed for holding a container, and a retracted storage position in which said holding member is positioned in a compact position adjacent the component front wall; and said container holding member including a transverse wall, and also including an upper support member adapted to support a side of the container placed therein when said holding member is in said extended use position, said upper support member being pivotally connected to said transverse wall for movement to a folded position when said holding member is moved to said retracted storage position.

15. A container holding armrest for a vehicle, comprising:

an armrest having sidewalls and a front wall;

a holding member shaped to hold a container therein;

bracket means for supporting said holding member, said bracket means including inwardly facing means for attaching to the exterior surface of said armrest sidewalls; and means for movably mounting said holding member to said bracket means, said holding member being movable between an extended use position in which said holding member is exposed for holding a container, and a retracted storage position in which said holding member can be positioned in a compact position adjacent the exterior surface of the armrest front wall.

16. A container holder as defined in claim 15 wherein said sidewalls of said armrest have a generally horizontally oriented groove therein, said bracket means being adapted to engage said grooves.

17. A container holder as defined in claim 15 wherein said inwardly facing means includes clip means for engaging said armrest sidewalls for allowing said container holder to be installed on said armrest without the use of separate fasteners.

18. A container holder as defined in claim 15 wherein said holding member includes a pair of parallel, laterally extending legs with free ends spaced apart a distance such that said free ends straddle the armrest sidewalls, and wherein said bracket means includes a pair of brackets each including a slot therein shaped to slidingly receive said free ends so that said holding member can slide between said extended use position and said retracted storage position.

19. A container holder as defined by claim 18 wherein said holding member includes a transverse wall, and said transverse wall and said legs form a pocket for receiving a container when said holding member is in said extended use position.

20. A container holder for a vehicle having a component therein with opposing sidewalls and a front wall, comprising:

a U-shaped drawer-like member for holding a container defined by a transverse wall and a pair of laterally extending spaced apart legs extending from said transverse wall; and a pair of brackets for attachment to the opposing exterior sides of the component sidewalls, each of said brackets having a slot therein to slideably receive a corresponding leg of said legs so that said drawer-like member can be positioned in the vehicle with said legs straddling the component, said drawer-like member being movable between an extended use position in which said transverse wall and said extending legs form a pocket for receiving a container, and a retracted storage position in which said legs straddle the vehicle component with said transverse wall positioned adjacent the front wall of the component.

21. A container holder as defined by claim 20 wherein said drawer-like member includes a foldable floor for supporting the container thereon, said floor being pivotally connected to said transverse wall and movable between a substantially horizontal position when said drawer-like member is in said extended use position and a substantially vertical position when said drawer-like member is in said retracted position.

22. A container holder as defined by claim 20 wherein said drawer-like member includes a floor for supporting the container thereon, said floor including a first and second bottom plate member, said first bottom plate member being pivotally connected to said drawer-like member transverse wall and also pivotally connected to said second bottom plate member, said second bottom plate member also being pivotally connected to said brackets so that as said drawer-like member is moved to said storage position, said first and second members fold into an accordion-like compact arrangement adjacent and between said drawer-like member transverse wall and the front wall of the armrest.

23. A container holder as defined by claim 20 including an upper support member for supporting a side of a container placed therein when said container holder is in said extended use position, said upper support member being pivotally connected to said transverse wall for movement to a collapsed position when said holding member is moved to said retracted storage position.

24. A container holder for a vehicle having a component therein with opposing sidewalls and a front wall, comprising:
   a drawer-like member for holding a container therein, said drawer-like member including a transverse wall and a pair of laterally extending legs, said legs being spaced apart and forming a U-shape with said transverse wall, said drawer-like member being movable between an extended use position in which said transverse wall and said extending legs form a pocket for receiving a container, and a retracted storage position in which said legs straddle the vehicle component with said transverse wall positioned adjacent the front wall of the component; said drawer-like member further including a floor for supporting a container thereon, said floor including a first and second bottom plate member, said first bottom plate member being pivotally connected to said drawer-like member transverse wall and also pivotally connected to said second bottom plate member, said second bottom plate member also being pivotally connected to said pair of brackets, said first and second bottom plate members being cooperatively movable so that as said drawer-like member is moved to said retracted storage position, said first member and said second member fold into an accordion-like compact arrangement adjacent and between said drawer-like member transverse wall and the front wall of the component; and
   means for mounting said drawer-like member to a component of a vehicle.

25. The apparatus as defined in claim 24 wherein said drawer-like member further includes an upper support member for supporting a side of the container placed therein when said drawer-like member is in said extended use position, said upper support member being pivotally connected to said drawer-like member transverse wall for pivotal movement to a folded position when said drawer-like member is in said retracted storage position.

* * * * *

UNITED STATES PATENT AND TRADEMARK OFFICE
CERTIFICATE OF CORRECTION

PATENT NO. : 5,253,838

DATED : October 19, 1993

INVENTOR(S) : David J. Spykerman

It is certified that error appears in the above-identified patent and that said Letters Patent is hereby corrected as shown below:

Column 7, line 7;
"which was" should be --which said--.

Signed and Sealed this

Ninth Day of August, 1994

*Attest:*

BRUCE LEHMAN

*Attesting Officer*     *Commissioner of Patents and Trademarks*